United States Patent
Gutmann

(10) Patent No.: US 6,296,692 B1
(45) Date of Patent: *Oct. 2, 2001

(54) AIR PURIFIER

(76) Inventor: Rudolf Gutmann, Kanalstrasse 14, D-75417 Mühlacker (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,289
(22) PCT Filed: May 8, 1996
(86) PCT No.: PCT/EP96/01927
  § 371 Date: Feb. 10, 1998
  § 102(e) Date: Feb. 10, 1998
(87) PCT Pub. No.: WO96/35513
  PCT Pub. Date: Nov. 14, 1996

(30) Foreign Application Priority Data

May 8, 1995  (DE) .................................. 295 07 629
Aug. 22, 1995 (DE) .................................. 195 30 785

(51) Int. Cl.⁷ ................................................ B03C 3/36
(52) U.S. Cl. ........................... 96/62; 96/63; 96/222; 96/381
(58) Field of Search ............................... 96/60, 62, 16, 96/63, 224, 381, 384, 385, 222; 55/418, 458

(56) References Cited

U.S. PATENT DOCUMENTS

| | | | |
|---|---|---|---|
| 2,242,163 | * 5/1941 | Bargeboer | 96/224 |
| 2,415,621 | * 2/1947 | Arnhym | 96/381 |
| 2,418,339 | * 4/1947 | Ehrgott | 96/224 X |
| 2,553,711 | * 5/1951 | Jackson | 96/224 |
| 2,850,641 | * 9/1958 | Martin, Jr. | 96/16 X |
| 3,518,046 | * 6/1970 | Cicirello | 96/224 |
| 3,623,295 | * 11/1971 | Shriner | 96/17 |
| 4,210,429 | * 7/1980 | Golstein | 96/224 X |
| 4,344,776 | * 8/1982 | Yavnieli | 96/63 |
| 4,810,269 | * 3/1989 | Stackhouse et al. | 96/381 |
| 5,185,015 | * 2/1993 | Searle | 96/224 X |
| 5,225,167 | * 7/1993 | Wetzel | 96/224 |
| 5,399,319 | * 3/1995 | Schoenberger et al. | 96/224 |

FOREIGN PATENT DOCUMENTS

| | | | |
|---|---|---|---|
| 2035789 | * 2/1971 | (DE) | . |
| 2132410 | * 1/1973 | (DE) | . |
| 3528590 | * 2/1987 | (DE) | . |
| 3921387 | * 7/1990 | (DE) | . |
| 60-114361 | * 6/1985 | (JP) | . |
| 8603141 | * 6/1986 | (WO) | . |

* cited by examiner

*Primary Examiner*—Richard L. Chiesa

(57) ABSTRACT

An air cleaning apparatus provides a housing with a column shape and an air cleaning unit within a portion of the housing, the cleaning unit having a complementary shape. The air inlet and outlet nozzles to the housing are provided at a top and bottom face, with the inlet and outlet openings to the air cleaning unit corresponding with the housing nozzle inlets and outlets locations. However, the air cleaning unit inlet and outlet openings are displaced from the nozzle inlets and outlets.

8 Claims, 2 Drawing Sheets

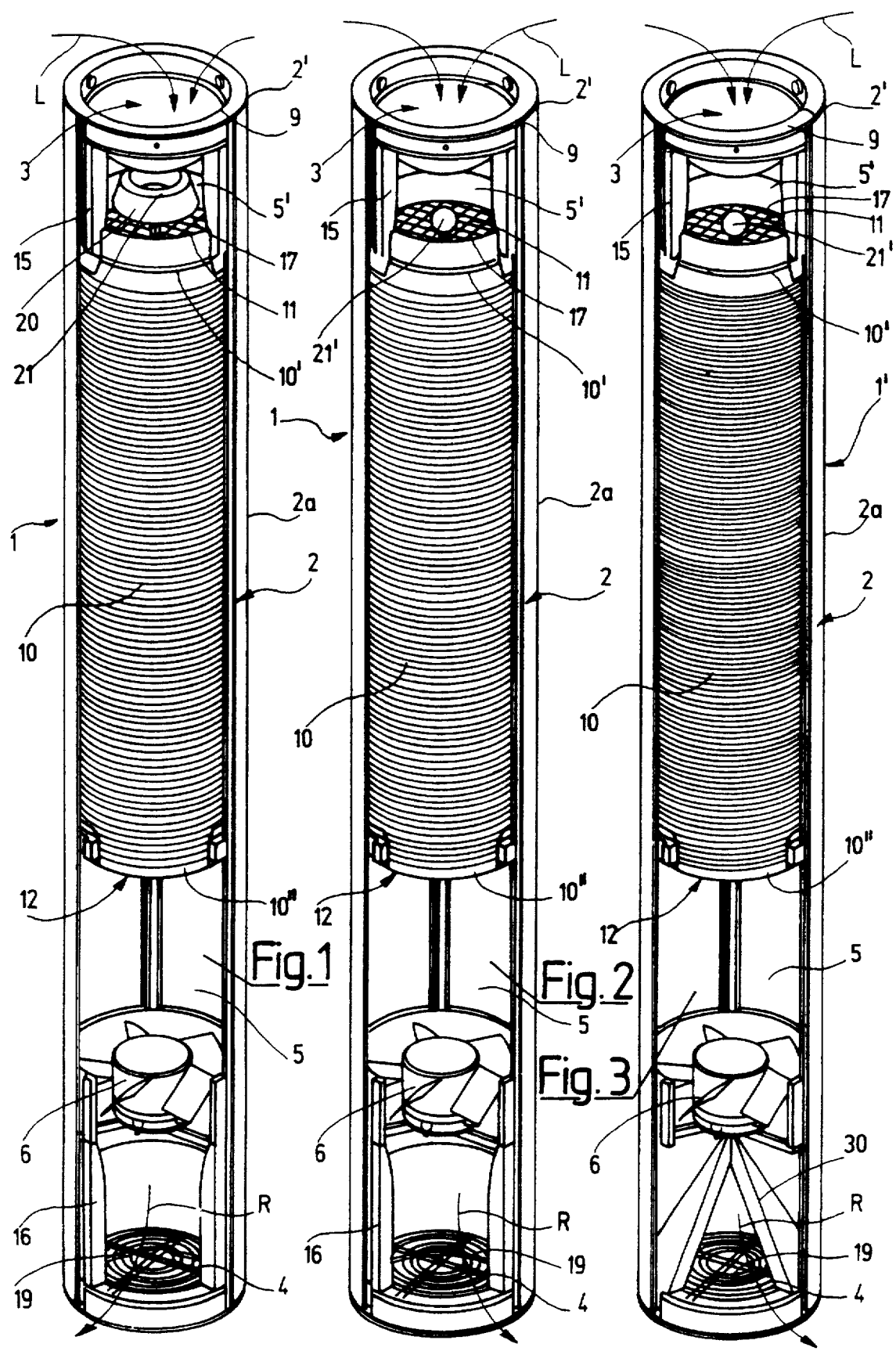

AIR PURIFIER

Figure 4:
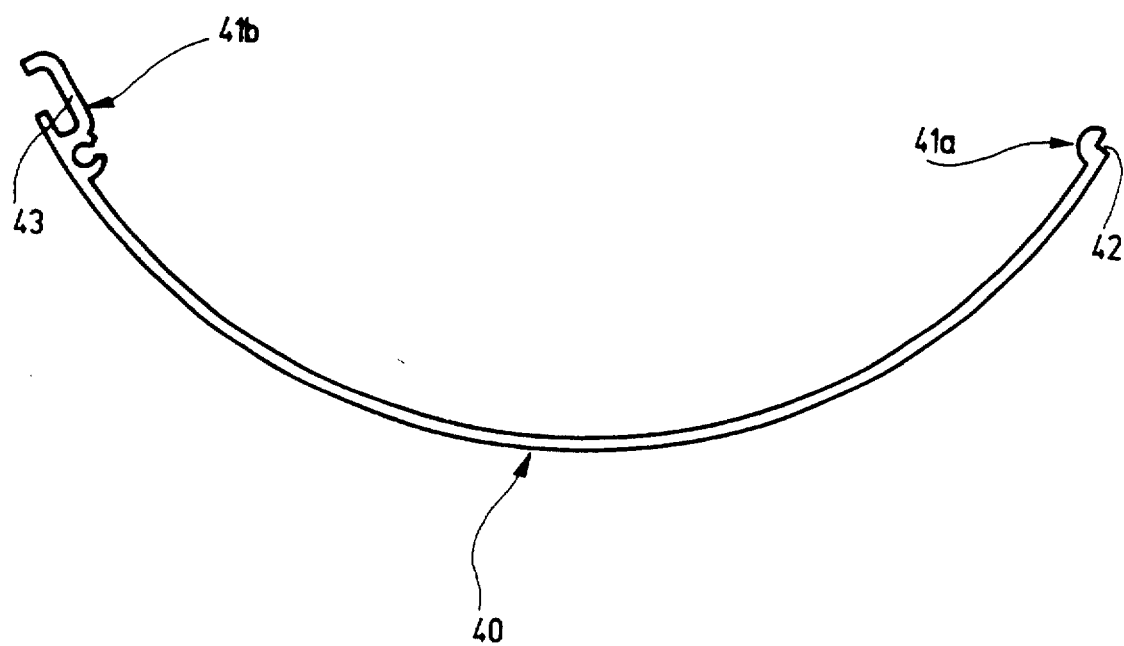

This application is the national stage of International Application No. PCT/EP96/01927, filed on May 8, 1996.

BACKGROUND OF THE INVENTION

1. Field of the Invention

The invention relates to an air-leaning apparatus for room air, especially an electrostatic air-cleaning apparatus, having a housing, in which an inlet nozzle and an outlet nozzle for an air-current to be cleaned are provided, which is led to an air-cleaning unit provided in said housing, wherein said housing of said air-cleaning apparatus is column-like, wherein said air cleaning unit in the column-like housing is tube-like, wherein said column-like housing comprises an essentially air-tight outer sheath, and wherein said inlet nozzle for said air-current to be cleaned is provided in a first front face of said column-like housing.

2. Discussion of the Prior Art

Such an air-cleaning apparatus for room air is known from DE-OS 2 132 410. There the outlet nozzle is arranged in the outer sheath of the housing of the known air-cleaning apparatus. Such an arrangement brings forth in a disadvantageous manner that the course of flow of the air current passing through the known air-cleaning apparatus is not straight, so that, in an disadvantageous manner, turbulences occur in the course of flow, which express themselves in a noise level which is extremely disadvantageous for air-cleaning apparatus for room air.

A further disadvantage of the outlet nozzle provided in the outer sheath of the known air-cleaning apparatus is given by the fact that hereby the cleaned air leaving the known air-cleaning apparatus is not led away far enough from the air-cleaning apparatus. So, in a disadvantageous manner, a large part of the cleaned air is sucked in again by the inlet nozzle and is supplied to the air-cleaning unit of the known air-cleaning apparatus again.

A further disadvantage of the known air-cleaning apparatus is due to the inlet opening of the air-cleaning unit having a much smaller diameter than the inlet nozzle of the column-like housing, so that a diminuition of the current cross-section occurs in the known air-cleaning apparatus. This causes in an disadvantageous manner turbulences in the region in front of the air-cleaning unit, leading to a deterioration of the flow characteristic in the air-cleaning unit of the known air-cleaning apparatus and by this to a reduction of its cleaning power.

The different diameters of the inlet nozzle of the column-like housing and the inlet opening of the air-cleaning unit has further the disadvantage that a barrier element for the air current has to be provided in the known air-cleaning apparatus, which prevents a part of the air current entering through the inlet opening of the known air-cleaning apparatus from bypassing the air-cleaning unit. Such a barrier element is also unfavourable from a aerodynamically point of view, because it leads to further turbulences of the air current and by this to a reduction of the cleaning power and a rise in the noise development.

From the DE-OS 2 035 789, such an air-cleaning apparatus comprising an electrostatic separator equipment is known. The air to be cleaned is ionized in a gas ionizer in a high voltage field, so that the floating particles in the air put against a separating surface of a following separator having also a high voltage field. The known electrostatic separator is arranged in a box-like housing having a cylindrical cross section with a noticeable larger diameter than the gas ionizer arranged inside the apparatus.

This above described electrostatic separator equipment as well as all the other known air-cleaning apparatus are, due to their box-like housings, only capable of cleaning the lower air layers of a room, so that a cleaning of the upper air layers can be accomplished not at all or only very insufficiently.

The known air-cleaning apparatus are capable of cleaning only a small amount of air per hour. This is caused by the fact that the known air-cleaning apparatus used in living spaces, business premises or restaurants must be built relatively compact, because most of the customers regard it as disturbing, if, for example in their living room, a bulky box stood, which would be necessary with a known air-cleaning apparatus in order to accommodate the technical components necessary for achieving an adequate cleaning performance.

Due to the positioning of the known air-cleaning apparatus near to the floor, the employable power of a fan sucking in the air is relatively small, as otherwise the persons being in that room would be exposed to an unpleasant draft.

Because of the compact construction of the known air-cleaning apparatus due to the above-mentioned reasons, only very poor sound isolation means can be employed, which is therefore capable only to absorb a small amount of the operating noises of the known air-cleaning apparatus. This once again leads to only a limited performance of the known air-cleaning apparatus.

From DE-OS 35 28 591, there is known a column-like air conditioning device, the housing of which has an essentially air-tight outer sheath and is provided with an inlet and an outlet opening. The air conditioning device consists of a fan having on its pressure side an ion generator and an electric dust separator located on the feed side of the ion generator. The disadvantage of the known air conditioning device is that it only can be set-up in its horizontal direction, so that also with this device the afore-described disadvantages still occur.

From DE-OS 39 21 387, there is known a box-like air-cleaner having air inlet openings in its lateral surface. The air current being sucked in through one of these air inlets openings streams through an electric separating device using a corona discharge.

From JP 60-114361 in Patents Abstracts of Japan, sect. C, vol.9 (1985), no. 260 (C309), there is known an air-cleaning apparatus having air inlet and air outlet openings at both of its lateral surfaces, whereby the air current entering through the inlet opening passes through an electrostatic cleaning device.

From WO 8/103141, there is known an air-cleaning apparatus for treating the emission products of a wood burning stove. The requirements, which this air-cleaning apparatus has to fulfill in order to accomplish its function, are generally not compareable to those for an air-cleaning apparatus for room air, which is designed for an employment in living rooms. While the air-cleaning apparatus for room air has to have a low noise level, does not cause draught, and has to be built in an aesthetic way, these properties do not play any role for an air-cleaning apparatus used in an exhaust fume cleaning-system like the one known from the above-mentioned document. Furthermore, the known air-cleaning apparatus provides that the emission products produced by the combustion furnace are supplied to a vertically mounted air-cleaning unit by a passageway. In order to easily discharge the filtered, condensated emission products, the known air-cleaning apparatus has trays between the inlet nozzle of the air-cleaning apparatus and the end of the passageway having a smaller diameter as the passageway. Such trays are very disadvantageous in an aerodynamic aspect. Such a narrowing of the current path of the air current to be cleaned by the trays leads inevitably to turbulences bringing forth a decreasing efficiency as well as to a noise development being not acceptable for air-cleaning apparatus for room air being used in living rooms.

The U.S. Pat. No. 3,623,295 describes an exhaust fume cleaning-system being preferably designed for use in automobiles. It comprises an air-cleaning unit being mounted in a tube. One end of the tube is linked to the muffler of a motor vehicle, so that the emission products escaping from the motor of the vehicle are already cooled in the muffler as well as reduced in respect to their pressure. Such a system is not suitable for the use as an air-cleaning apparatus for room air because it is not capable to fulfill the afore-described requirements for such air-cleaning apparatus for living rooms.

SUMMARY OF THE INVENTION

Therefore, it is the object of the invention to further develop an air-cleaning apparatus for room air of the afore mentioned type in order to reach a high cleaning power despite of a compact construction.

That object is achieved according to the invention in that the outlet nozzle is provided in the front face of said column-like housing, that said air-cleaning unit provided in said column-like housing is formed tube-like, that an inlet opening of said air-cleaning unit is provided in one of its front faces and is aligned with said inlet nozzle of said column-like housing, and that an outlet opening of said air-cleaning unit is provided in its other front face and is aligned with said outlet nozzle of said column-like housing of said air-cleaning apparatus, so that an essentially straight course of air flow between said inlet nozzle of said air-cleaning apparatus and said inlet opening as well as between said outlet opening and said outlet nozzle of said column-like air-cleaning apparatus is provided.

A further advantage of the inventive air-cleaning apparatus is that by means of the column-like shape of the housing, it is achieved that the inventive air-cleaning apparatus not regarded as a disturbing body in a room, but it is considered as prestigeous decoration element. The inventive provision of a closed outer sheath allows that the inventive air-cleaning apparatus in an advantageous manner can be provided with various decoration elements, for example a foil decor, a natural wood decor or a powder coating, so that the air-cleaning apparatus can be extremely easy adapted in an advantageous manner to the ambience of the room where it is located.

The column-like shape of the inventive air-cleaning apparatus has furthermore the advantage that the air-cleaning apparatus can be very easily made longer this without having the effect of being optically disturbing or looking bulky. By the easily possible elongation of the housing it is very easily possible to use a longer air-cleaning unit, through which a higher cleaning degree is achieved in an very advantageous manner. Furthermore, the inventive column-like shape of the air-cleaning apparatus allows to use an electrostatic air-cleaning unit which needs a lower high voltage for the ionization of debris than the known air-cleaning apparatus do. This has the advantage that the inventive air-cleaning apparatus sets free clearly less ozone than the known air-cleaning apparatus.

A further advantageous embodiment of the invention provides that the inventive air-cleaning apparatus is built as a stand-alone apparatus, wherein the inlet nozzle is located at the upper end and the outlet nozzle at the lower end of the inventive air-cleaner apparatus. Such a measure has the advantage that the inventive air-cleaning apparatus allows in an advantageous manner to suck in air even from the upper areas of a room.

Furthermore, the afore-described arrangement yields the advantage that the warm air gathering in the upper areas of a room is transported to the lower area, and reascends after passing through the inventive air-cleaning apparatus and leaving the lower nozzle. The counter-current built up in this way results in a reduction of the sinking velocity of particles being in the air of the room, so that even heavy particles can be gathered easily and reliably.

A further advantageous embodiment of the invention provides that the rim surface of the air-cleaning apparatus surrounding the inlet nozzle has a rounded shape. This measure has the advantage that the flow-conditions in the area of the inlet nozzle are improved.

A further advantageous embodiment of the invention provides that the inlet opening of the air-cleaning unit of the inventive air-cleaning apparatus is arranged spaced apart from the inlet nozzle of the housing inside the column-like housing of the air-cleaning apparatus. Such a measure has the advantage that a current-leading element positioned in the free space between the inlet nozzle of the column-like housing and the inlet opening is not visible from the outside and therefore does not affect the advantageous aesthetic impression of the inventive air-cleaning apparatus.

A further advantageous embodiment of the invention provides that a light element is positioned in the space between the inlet nozzle of the column-like housing and the inlet opening. This has the advantage that the inventive air-cleaning apparatus can be used, beside its cleaning function, as a room lighting, too.

DETAILED DESCRIPTION OF THE DRAWINGS

Exemplary embodiments of the invention are shown in the drawings and will be described in detail below. The drawings show:

FIG. 1 a first embodiment of an air-cleaning apparatus,

FIG. 2 a second embodiment of an air-cleaning apparatus,

FIG. 3 a third embodiment of an air-cleaner apparatus, and

FIG. 4 a part of the housing of the air-cleaner apparatus.

DETAILED DESCRIPTION OF THE PREFERRED EMBODIMENT

The first embodiment of an air-cleaning apparatus 1 shown in FIG. 1 comprises a column-like housing 2 with a circular, oval or polygonal cross-section, having an essentially air-tight outer sheath 2a.

The housing 2 can be mounted on a foot, especially by putting it on the foot, or it can have holding elements for attaching the housing 2 of the air-cleaning apparatus 1 to a wall and/or on the ceiling of a room, especially of a living room.

In a first front face 2' of the column-like housing 2 there is an inlet nozzle 3, through which an air current L to be cleaned is sucked in from the environment of the air-cleaning apparatus 1. Viewed in the flow direction of the air current L sucked in, the inlet nozzle 3 is followed by an electrostatic air-cleaning unit 10, which is preferably spaced apart from the inlet nozzle 3, and which is built column-like or tube-like. An inlet opening 11 is arranged in a first front face 10' of the electrostatic air-cleaning unit 10 and is aligned with the inlet nozzle 3 of the column-like housing 2 of the air-cleaning apparatus 1. For this reason, the air current L sucked in through the inlet nozzle 3 does not exhibit turbulence and it therefore can enter the electrostatic air-cleaning unit 10, the exact construction of which is of no interest for the following description, almost without any noise.

After the air current L has passed the electrostatic air-cleaning unit 10, the thus cleaned air current leaves the air-cleaning unit 10 through an outlet opening 12 provided in a second front face 10" of the air-cleaning unit 10. The outlet opening 12 of the column-like air-cleaning unit 10 is in an advantageous manner aligned with an outlet nozzle 4 of the column-like housing 2 of the air-cleaning apparatus 1. For this reason, there is an essentially straight flow of the air current in this region, too. In a space 5 between the outlet opening 12 of the column-like air-cleaning unit 10 and the outlet nozzle 4 of the column-like housing 2 there is a fan unit 6 having a radial or an axial blower for effecting the above-mentioned flow of the air current L to be cleaned.

The air-cleaning apparatus 1 described above excels in a very low noise level, as the air current L passing through the air-cleaning column 1 is, due to its essentially straight guidance, well-designed seen from an aerodynamic point of view and almost without any turbulence. For this reason, the air-cleaning apparatus 1 produces very little air noise. As the air-cleaning apparatus 1 has a very low flow resistance, a fan unit 6 having a smaller power consumption than the ones required in conventional air-cleaning apparatus in order to suck in the same amount of air is sufficient in an advantageous way. In a reduction to practice of the described embodiment, being 1.4 meters long and having a radius of 8.5 cm, a noise level has been measured which was below 30 dBA.

The column-like construction of the air-cleaning apparatus 1 has the advantage that in an especially advantageous manner noise reduction elements 15, 16 can be provided especially easy in the apparatus 1, bringing forth a further reduction of the noise level created by the operation of the described air-cleaning apparatus 1. The first noise reduction element 15, being provided in a space 5' between the inlet nozzle 3 of the housing 2 and the inlet opening 11 of the air-cleaning unit 10, effects in an advantageous manner a dampening of the flow noise of the air current L being sucked into the air-cleaning column as well as of the operating noise of the electrostatic air-cleaning unit 10. In a corresponding way, the second noise reduction element 16, being provided in the lower space 5 of the column-like housing 2 between the fan unit 6 and the outlet nozzle 4, dampens the flow noise of the cleaned air current R leaving the air-cleaning apparatus 1 as well as of the operating noise of the fan unit 6 and the electrostatic cleaning unit 10.

A further enhancement of the advantageous properties of the described air-cleaning apparatus 1 is achieved by rounding the rim surface 9 of the housing 2 surrounding the inlet nozzle 3. This measure effects in an advantageous manner not only that an optimized flow of the air current L entering in the air nozzle 3 is achieved. Furthermore, this construction effects that in the environment of the air-cleaning apparatus 1 air is not only sucked in from the region above the inlet nozzle 3, but also from an environment reaching several tens of centimeters below the inlet nozzle 3.

In the space 5' being situated below the inlet nozzle 3 preferably a guide element 20 for the air current is arranged, which in an advantageous way enhances the flow velocity of the air current L in this region, thereby preventing the depositions of debris on the inner surface of the housing 2 in front of the air-cleaning unit 10. It is especially advantageous if the current guide element 20 is provided with a lighting element 21. The air-cleaning apparatus 1 thus constructed is capable of performing a dual function, i.e. it can operate as an air cleaner as well as an lighting device. Furthermore, it is possible, as shown by the second embodiment of FIG. 2, to provide the air-cleaning apparatus 1 instead of the current guide element 20 only with a lighting element 21' if one is willing not to employ the advantageous properties of the current guide element 20.

In the description given above, it was assumed the inlet nozzle 3 is arranged at the upper end of the column and the outlet nozzle 4 is arranged at the lower end thereof. In principle, it is possible to reverse the arrangement of the two nozzles 3 and 4, but the described arrangement has the advantage that, due to the guiding of the air current L to be cleaned from top to bottom, mainly the warm air being located in the upper region of the room is sucked in and is led through the column-like air-cleaning apparatus 1 down to the lower region of the room, from which it starts to ascend again. The air current produced thereby reduces in an advantageous way the sinking velocity of particles being present in the air, especially of heavier particles. Due to this, the heavier particles can be better sucked in and cleaned therefore more efficiently.

In respect to the construction of the first embodiment of the air-cleaning apparatus shown in FIG. 1, it must be stated that in the region of the inlet nozzle 3 mechanical filter means (not shown) can be provided. Furthermore, it is possible to provide the inlet opening 12 of the air-cleaning unit 10 with a protective mesh 17. A corresponding protective mesh 19 can optionally be arranged in the region of the outlet nozzle 4, too.

The column-like construction of the housing 2 of the air-cleaning apparatus 1 has furthermore the advantage that by this measure it is easily possible to arrange all the equipment which is necessary for the operation of the air-cleaning apparatus (not shown in FIG. 1) in the housing 2 itself, without being visible from the outside. For this reason the aesthetic impression of the air-cleaning apparatus 1 is not disturbed. For example, a receiving element of a remote control unit allowing the air-cleaning apparatus to be conveniently controlled can be integrated in the housing 2.

The air-cleaning apparatus 1' depicted in FIG. 3 has in principle the same of construction as the embodiments of FIGS. 1 and 2. For this reason, identical or similar parts are designated with the same reference numerals. The main difference between these two air-cleaning apparatus 1, 1' is given by the fact that in the region of the outlet nozzle 4 of the air-cleaning apparatus 1' a filter unit 30 is arranged. Preferably this filter unit 30 is constructed as a carbon filter and/or as an ozone filter. Furthermore, the filter unit 30 can have an element for the release of a deodorizing substance.

It must be stated that the described embodiments of the air-cleaning apparatus 1, 1' only have a single air-cleaning unit 10, which is not absolutely necessary. Rather, it is possible to arrange two or more air-cleaning units 10 in the housing 2, which are then preferably arranged parallel to each other. It is also possible to arrange the air-cleaning unit 10 spiral-like in the housing 2 in order to have a longer air path in the electrostatic air-cleaning unit 10 resulting in a higher degree of purification. It does not require any further mentioning that in the housing 2 two or more spiral-like air-cleaning units 10 can be arranged.

In FIG. 4 a segment 40 is shown, which is suited in an especially advantageous manner for the construction of the housing 2 of the described air-cleaning apparatus 1, 1'. The segment-like construction of the housing 2 has the advantage that it facilitates an easy pre-mounting of the air-cleaning unit 10 as well as the further equipment co-operating with the air-cleaning unit 10, i.e. before the housing 2 is put around such pre-fabricated components. Each of the at least two segments 40 of the housing 2 has on its two longitudinal edges connecting elements 41*a*, 41*b* for putting together the two segments 40 to form the housing 2. It is of advantage that the first connecting element 41*a* is formed like a hook-like protrusion 42 and that the adjacent connecting element 41*b* of the following segment is an element 43 formed complementary to the hook-form of the first connecting element 41*a* and engaging the hook-like protrusion.

What is claimed is:

1. An air-cleaning apparatus, for cleaning a stream of air passed through said apparatus, comprising:

a column-shaped housing, formed of an air-tight outer sheath, said housing having first front face which includes an inlet nozzle, and a second front face which includes an outlet nozzle, wherein said stream of air is directed through said housing from one face to the other;

an air-cleaning unit provided within said housing, said air-cleaning unit having a shape which is complementary to said column shape of said housing, said air-cleaning unit having a front face that includes an inlet opening and an other face that includes an outlet opening, wherein said outlet opening is aligned with said outlet nozzle of said housing and said inlet opening is aligned with said inlet nozzle such that an essentially straight air flow path exists between said inlet nozzle and said inlet opening and between said outlet opening and said outlet nozzle;

said inlet nozzle is provided in the front face, at a top of said housing;

said first front face of said housing surrounding said inlet nozzle includes a rim which has a rounded shape;

said inlet opening of said air-cleaning unit is spaced apart, in the flow direction of said air current, from said inlet nozzle;

an air stream guide element is provided in front of said inlet opening of said air-cleaning unit;

a first noise reduction element is mounted between said inlet nozzle of said housing and said inlet opening of said air-cleaning unit;

a second noise reduction element is mounted between said outlet nozzle of said housing and said outlet opening of said air-cleaning unit;

a fan-unit is provided between said outlet opening and said outlet nozzle;

said outlet opening of said air-cleaning unit is spaced apart, in the flow direction, from said outlet nozzle of said column-shaped housing of said air cleaning apparatus.

2. The air-cleaning apparatus according to claim 1, wherein a lighting element is provided in a space of said housing between said inlet nozzle and said inlet opening.

3. The air-cleaning apparatus according to claim 1, wherein said air-cleaning unit is an electrostatic air-cleaning unit.

4. The air-cleaning apparatus according to claim 1, wherein said housing has one of a circular, oval and polygonal cross section.

5. The air-cleaning apparatus according to claim 1, wherein said housing is mountable on a foot.

6. The air-cleaning apparatus according to claim 1, further including holding elements provided on said housing for fixing said housing to one of a wall and one of a ceiling.

7. The air-cleaning apparatus according to claim 1, wherein at least two of said air-cleaning units are provided in said housing.

8. The air-cleaning apparatus according to claim 1, wherein said first front face of said housing surrounding said inlet nozzle includes a rim which has a rounded shape.

* * * * *